US009643579B2

(12) United States Patent
Rodriguez et al.

(10) Patent No.: US 9,643,579 B2
(45) Date of Patent: May 9, 2017

(54) PRIMARY PISTON FOR A TANDEM MASTER CYLINDER AND TANDEM MASTER CYLINDER EQUIPPED WITH SUCH A PRIMARY PISTON

(75) Inventors: Marc Rodriguez, Beverley Hills, MI (US); Olivier Bernadat, Le Perreux (FR); Laurent Lhuillier, Le Blanc Mesnil (FR); Marc Noblet, Paris (FR); Julien Gateau, Gentilly (FR); Daniel Grech, Lamorlaye (FR); Carole Charpentier, Montmorency (FR)

(73) Assignee: ROBERT BOSCH GMBH, Stuttgart (DE)

( * ) Notice: Subject to any disclaimer, the term of this patent is extended or adjusted under 35 U.S.C. 154(b) by 680 days.

(21) Appl. No.: 13/996,940

(22) PCT Filed: Dec. 1, 2011

(86) PCT No.: PCT/EP2011/071508
§ 371 (c)(1),
(2), (4) Date: Feb. 7, 2014

(87) PCT Pub. No.: WO2012/084450
PCT Pub. Date: Jun. 28, 2012

(65) Prior Publication Data
US 2014/0165553 A1    Jun. 19, 2014

(30) Foreign Application Priority Data
Dec. 21, 2010   (FR) ..................................... 10 05013

(51) Int. Cl.
*B60T 11/16* (2006.01)
*B60T 13/10* (2006.01)
(Continued)

(52) U.S. Cl.
CPC ............. *B60T 13/10* (2013.01); *B60T 11/16* (2013.01); *B60T 11/20* (2013.01); *B60T 11/232* (2013.01); *B60T 8/38* (2013.01)

(58) Field of Classification Search
CPC ...... B60T 11/20; B60T 11/228; B60T 11/232; B60T 11/236
(Continued)

(56) References Cited

U.S. PATENT DOCUMENTS 4,320,624 A * 3/1982 Takeuchi ................ B60T 11/22
60/588
4,945,728 A * 8/1990 Coleman ............... B60T 11/236
277/572
(Continued)

FOREIGN PATENT DOCUMENTS

CN    101332811    12/2008
CN    101909958    12/2010
(Continued)

*Primary Examiner* — Michael Leslie
*Assistant Examiner* — Richard Drake
(74) *Attorney, Agent, or Firm* — Gerard Messina

(57) ABSTRACT

A primary piston composed of a skirt and an intermediate back wall having a rear face receiving the servobrake thrust rod and a forward face for the telescoping rod and the spring pushing the secondary piston. The front of the skirt has longitudinal grooves open in front and closed in the rear. The thickness of the skirt beneath the grooves and the part of the skirt between two successive grooves in the peripheral direction form a front face enabling the principal piston to push the secondary piston. The principal piston is made of a single piece of plastic material.

14 Claims, 4 Drawing Sheets

(51) Int. Cl.
*B60T 11/20* (2006.01)
*B60T 11/232* (2006.01)
*B60T 8/38* (2006.01)

(58) Field of Classification Search
USPC .................................. 60/562, 533; 92/169.1
See application file for complete search history.

(56) References Cited

U.S. PATENT DOCUMENTS

| | | | | |
|---|---|---|---|---|
| 6,269,731 | B1* | 8/2001 | Gautier | B60T 8/3275 91/369.2 |
| 6,584,771 | B2* | 7/2003 | Keller | B60T 11/16 60/588 |
| 2005/0115236 | A1* | 6/2005 | Kusano | B60T 11/22 60/533 |
| 2005/0253450 | A1* | 11/2005 | Giering | B60T 7/042 303/115.1 |
| 2005/0268608 | A1 | 12/2005 | Ludsteck et al. | |
| 2008/0022675 | A1* | 1/2008 | Drott | B60T 11/16 60/588 |
| 2008/0216473 | A1* | 9/2008 | Kim | B60T 11/236 60/588 |
| 2008/0289329 | A1* | 11/2008 | Gaffe | B60T 11/232 60/588 |
| 2009/0090105 | A1* | 4/2009 | Taira | B60T 11/16 60/585 |
| 2013/0213033 | A1* | 8/2013 | Konig | B60T 11/101 60/533 |
| 2014/0053546 | A1* | 2/2014 | Charpentier | B60T 11/232 60/562 |
| 2014/0251125 | A1* | 9/2014 | Fritschle | B60T 11/232 92/169.1 |

FOREIGN PATENT DOCUMENTS

| | | |
|---|---|---|
| DE | 19536610 | 4/1997 |
| DE | 10062988 | 7/2002 |
| EP | 1995138 | 11/2008 |
| EP | 2187064 | 5/2010 |
| EP | 2193964 | 6/2010 |
| FR | 2912713 | 8/2008 |
| FR | 2916405 | 11/2008 |
| JP | 2004-28339 | 1/2004 |
| JP | 2006-126619 | 5/2006 |
| WO | WO2005/066005 | 7/2005 |
| WO | WO 2006/126619 | 11/2006 |

* cited by examiner

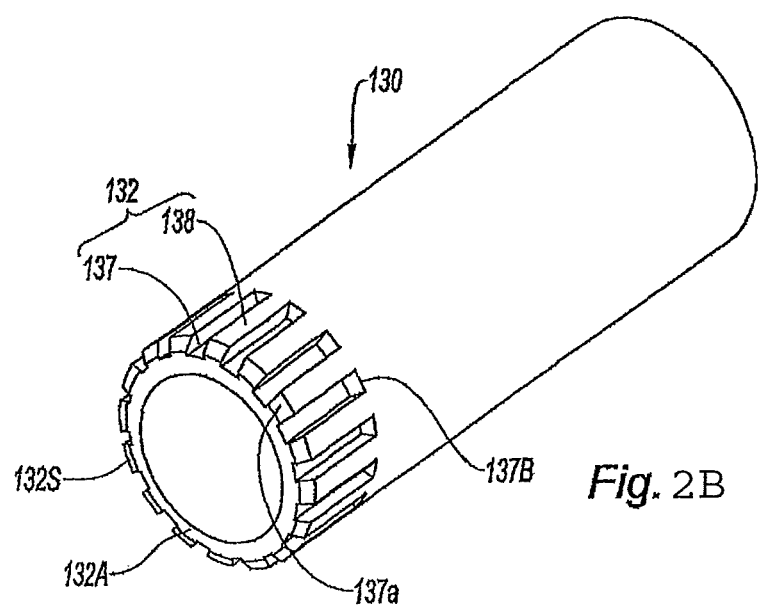
Fig. 2B
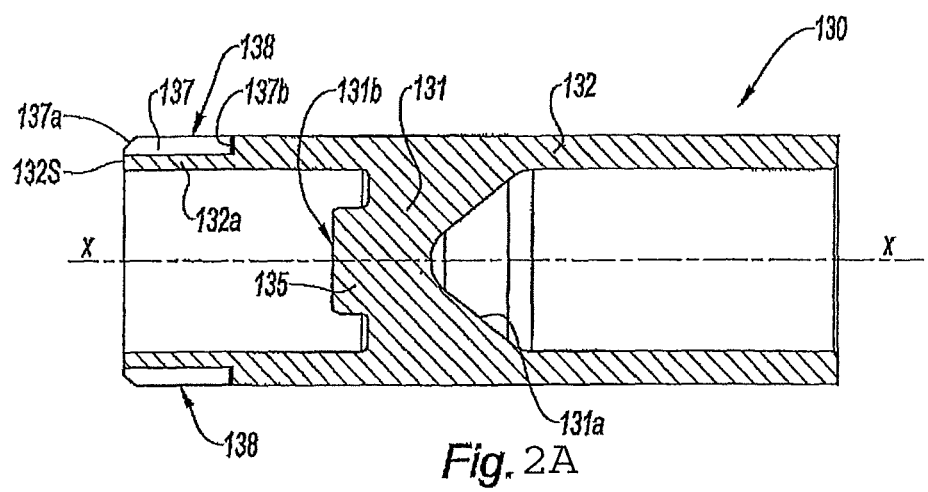
Fig. 2A
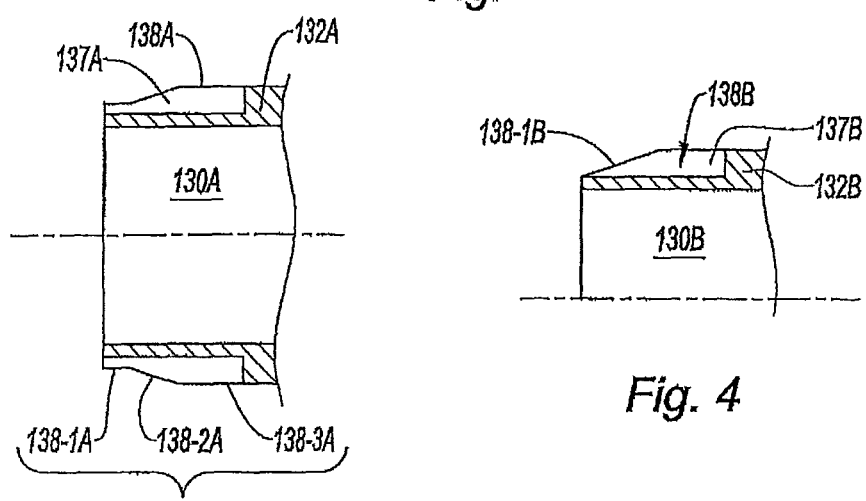
Fig. 3
Fig. 4

PRIMARY PISTON FOR A TANDEM MASTER CYLINDER AND TANDEM MASTER CYLINDER EQUIPPED WITH SUCH A PRIMARY PISTON

FIELD OF THE INVENTION

The present invention concerns a tandem master-cylinder primary piston composed of a skirt equipped with a back wall in an intermediary position between the extremities of the skirt, a rear face serving as a support for the servobrake thrust rod and the other accommodating the telescoping rod and compression spring acting on the secondary piston. The skirt has a forward extremity equipped with passages cooperating with the supply chamber to connect it with the pressure chamber delimited in the body of the master cylinder by the forward part of the primary piston, and cooperating with the resupply seal housed in a groove of the body of the master cylinder to allow passage of hydraulic fluid in ESP mode.

The invention also concerns a tandem master cylinder equipped with such a primary piston.

BACKGROUND INFORMATION

FIGS. 5A, 5B, and 6 illustrate a known embodiment of a tandem master cylinder. These views are limited to cutaways of the primary piston.

Known master cylinder 300 consists of body 310 traversed by bore hole 320 along axis xx accommodating primary piston 330 controlled by a servobrake, not shown, or directly by action exerted on the brake pedal. Primary piston 330 delimits pressure chamber 340 connected to the primary brake circuit. Pressure chamber 340 is separated from supply chamber 350, consisting of a peripheral groove in body 310. On the forward side, supply chamber 350 is bordered by peripheral groove 351 accommodating resupply seal 353 and, in the rear, on the exterior side, supply chamber 350 is bordered by rear groove 352 accommodating seal or isolation seal 380. Primary piston 330 is formed of skirt 332 having an intermediary back wall 331 separating the hollow forward portion from the equally hollow rear portion. Back wall 331 receives, on rear face 333b, the thrust rod of the servobrake and, on its forward face 331a, back wall 333 presses against telescoping rod 370, formed of two parts 371, 372 and spring 373 cooperating with the secondary piston, which is not shown in FIGS. 5A, 5B, 6.

On the forward side, that is to say, on the side of pressure chamber 340 delimited by primary piston 330 in bore hole 320 of the master cylinder, skirt 332 is traversed by a crown of holes 333 that ensures communication between supply chamber 350 and the forward portion, inside the primary piston delimiting pressure chamber 340. This crown of holes 333 is realized in frustoconical groove 334 on the front of skirt 332 to facilitate the passage of brake fluid whenever primary piston 330 is in rest position and the brake system is operating in ESP mode. Crown of holes 333 is then found immediately below seal 353 and allows hydraulic fluid to flow from supply chamber 350 to pressure chamber 340.

FIG. 5A is a partial axial cutaway of known primary piston 330 installed in tandem master cylinder 300, which is only partly represented. This partial cutaway illustrates the particular shape of back wall 331, with its cavity, in rear face 331a receiving the thrust rod of the servobrake and front face 331b equipped with boss 335, which serves to center spring 373. FIG. 5B also illustrates frustoconical groove 334, whose taper is turned toward the front of primary piston 330 thereby relieving the forces exerted on seal 353, as shown in the partial cutaway of FIG. 5B.

Primary piston 330 is aluminum or an aluminum alloy and requires significant machining. Additionally, specific precautions must be taken for holes 333 in order to eliminate machining burrs. This is represented overall in a primary piston requiring relatively complex and costly machining and, subsequently, a costly tandem master cylinder.

SUMMARY

An object of the present invention is to develop a tandem master-cylinder primary piston as well as a tandem master cylinder that can be manufactured easily and at low cost.

To that end, an object of the invention is a primary piston of the type described above. The primary piston according to the present invention includes a skirt and a back wall in intermediate position, made of plastic material, wherein the forward end of the skirt has a crown of ribs delimiting closed grooves in the rear and emerging near the front to ensure passage between the supply chamber and the pressure chamber; according to a variant embodiment at least one of these grooves crosses through to an internal cavity of the piston, thereby forming a slit whenever the primary piston is in supply position, and to enable the passage of hydraulic fluid beneath the resupply seal whenever the piston is in rest position and the brake system is operating in ESP mode.

The primary piston according to the invention is easily made by the injection molding of plastic material, and the part leaving the mold is ready for assembly without requiring any finishing work. The primary piston thus realized satisfies all the conditions that a primary piston must meet and, in particular, its frontal surface is sufficiently large that, in the event of a fault, it can directly push the secondary piston.

In general, the invention enables the realization of a primary piston of plastic material, sufficiently resistant to the mechanical forces to which it might be exposed. Because of its simple shape, it can be manufactured from injected plastic material. These functional characteristics are equally advantageous, for the piston can assist in disrupting hydraulic flow while having a damping effect on fluid hammer phenomena.

Finally, the piston according to the invention allows for a significant reduction in the cost of manufacture.

According to a variant embodiment, the grooves terminate in front in a forward, cylindrical extremity, continuing as a conical transition to rejoin a cylindrical portion.

According to another characteristic, the grooves terminate in a conical front portion.

According to another advantageous characteristic, the unopen back end of the grooves is straight, transverse.

According to another advantageous characteristic, the grooves have a helical shape.

According to another advantageous characteristic, at least one of the grooves is a slit.

Thus, the rear straight edge of the grooves promotes cooperation between the resupply seal and the primary piston in resupply mode or when the ESP system is operating.

The present invention also concerns a tandem master cylinder of the type described above, having a primary piston of plastic material whose front is equipped with grooves that form passages for hydraulic fluid between the supply chamber and the pressure chamber or that facilitate the passage of hydraulic fluid beneath the resupply seal whenever the primary piston is in rest position and ESP mode activates the brake system.

BRIEF DESCRIPTION OF THE DRAWINGS

FIG. 2A is a partial axial cutaway of the primary piston according to the invention.

FIG. 2B is an isometric view of the primary piston according to the invention.

FIG. 3 is an axial cutaway of a variant of the primary piston.

FIG. 4 is a partial cutaway of another variant of the invention.

DETAILED DESCRIPTION

Figure 1:
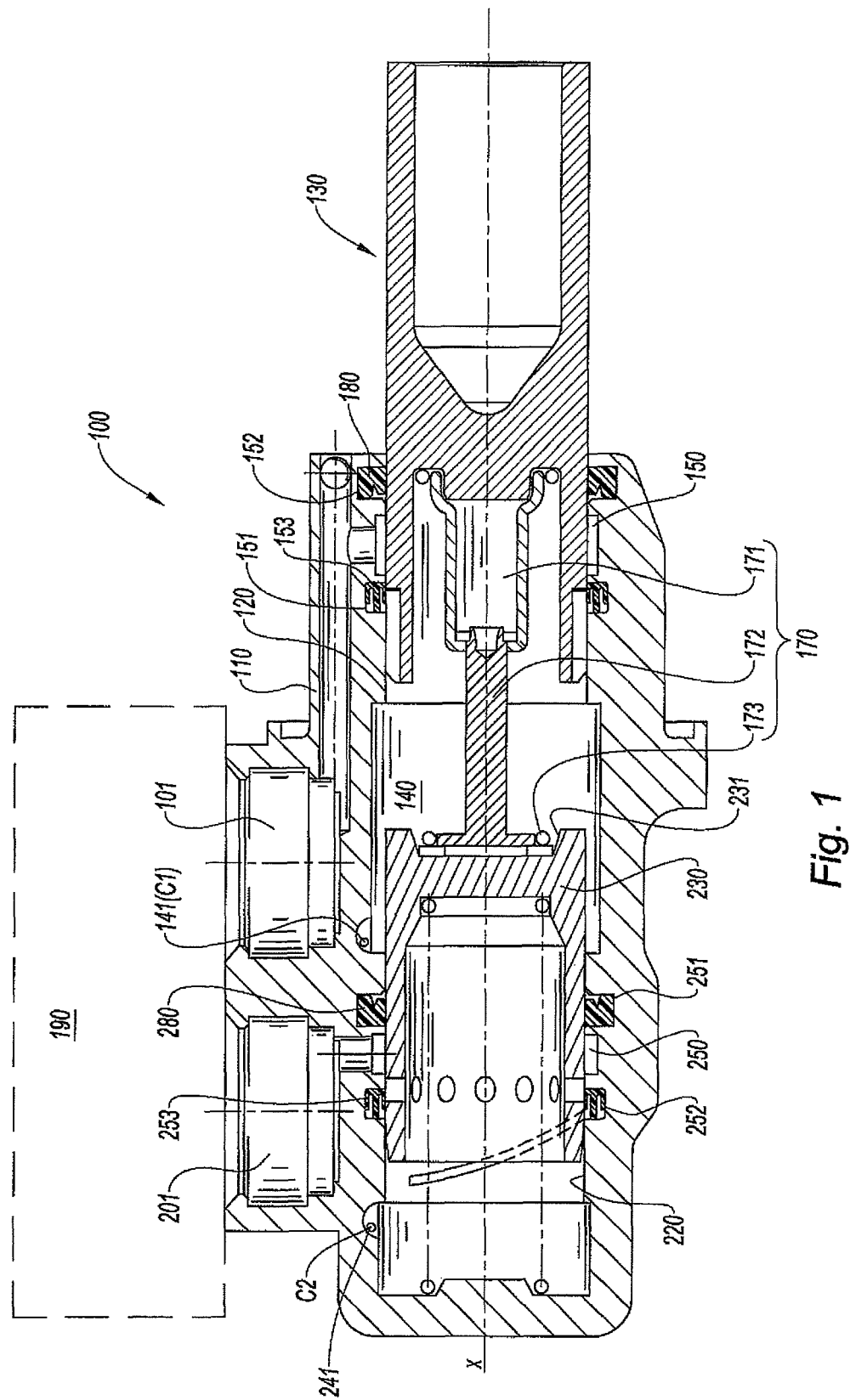
FIG. 1 is a schematic axial cutaway of a tandem master cylinder equipped with a primary piston according to the invention.

FIG. 1 illustrates a tandem master cylinder 100 of a brake system according to the invention.

The master cylinder will be described below for the portion involving the primary piston, it being understood that this description applies in practice to the secondary piston and the environment in the tandem master cylinder for all the duplicated elements, enabling control of two independent brake circuits.

The master cylinder includes body 110 traversed by bore hole 120 along axis (xx) accommodating primary piston 130 controlled either by a servobrake, not shown, or directly by the action exerted on the piston by the brake pedal. The direction of movement of primary piston 130 is indicated by arrow AF, which corresponds to a braking action going from right to left, according to FIG. 1.

The top of the master cylinder is provided with two inlets 101, 201 for the exit nozzles of brake fluid reservoir 190, which is simply sketched.

Primary piston 130 delimits, in bore hole 120, pressure chamber 140 connected to brake circuit C1 by drill hole 141. Pressure chamber 140 is separated by hollow primary piston 130 from resupply chamber 150 realized in a peripheral groove in body 110 of master cylinder 100. On the front side and rear side, supply chamber 150 is bordered by peripheral groove 151, 152 emerging in bore hole 120. Groove 151 receives peripheral resupply seal 153 and rear groove 152 has peripheral seal 180, still referred to as an isolation seal.

Resupply seal 153 enables brake fluid to be supplied from pressure chamber 140 if there is a lack of brake fluid or if the brakes are suddenly activated. The movement of opening and closing resupply seal 153 is described in document FR 2,916,405. Seal 180 separates supply chamber 150 from the exterior of master cylinder 100.

The two pistons 130, 230 are connected by telescoping rod 170 formed of two parts 171, 172 kept apart by spring 173 and being applied by their two extremities, one against back wall 131 of piston 130 and the other against back wall 231 of piston 230.

The above description of the primary portion of tandem master cylinder 100 also applies to the secondary portion incorporating secondary piston 230 and the duplication of a pressurizing device for two brake circuits C1, C2. The above description applies, under the same conditions, to the elements of the secondary portion, which bear the same reference numbers, increased by 100.

In FIGS. 1 and 2A, primary piston 130 of the tandem master cylinder according to the invention is made of a single piece of plastic material and includes skirt 132 equipped with back wall 131 in intermediate position between its two open extremities. Back wall 131 has rear face 131a of frustoconical shape, receiving the thrust rod of the servobrake, not shown, and forward face 131b, with central boss 135 for accommodating telescoping rod 170 and compression spring 173 associating primary piston 130 and secondary piston 230.

The exterior surface on the forward side (the side turned toward the secondary piston) of skirt 132 has an assembly of ribs 138 delimiting grooves 137, whose front 137a is open and whose back 137b is closed. Grooves 137 emerge in the surrounding surface of skirt 132. The thickness of skirt 132a beneath grooves 137 and in the interval of the grooves forms a significant forward surface 132S enabling primary piston 130 to directly push secondary piston 230 in the event of a failure of the normal connection between primary piston 130 and secondary piston 230.

The isometric view of primary piston 130 according to FIG. 2B illustrates the arrangement of grooves 137 in the front of skirt 132 of primary piston 130. In this embodiment, the grooves are parallel to the xx axis of piston 130 and their length is such that, when piston 130 is in rest position, rear edge 137b is found between supply chamber 150 and groove 151 of resupply seal 153.

Although grooves 137 are preferably parallel to the xx axis of primary piston 130, a helical form can also be given to grooves 137.

Figure 5A:
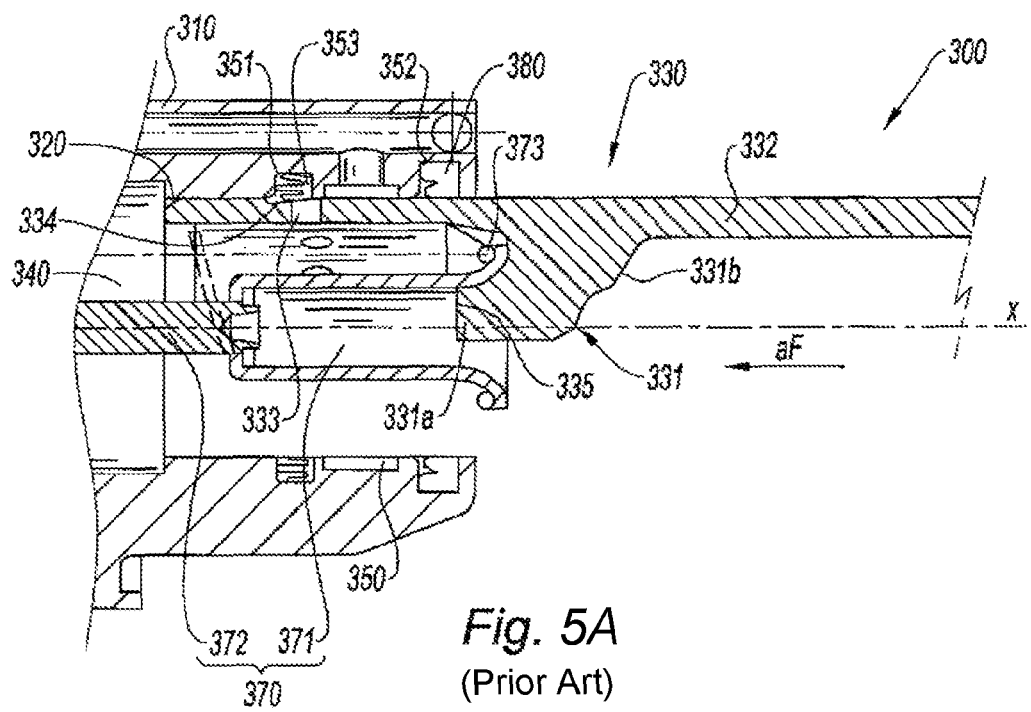
FIG. 5A is a partial cutaway of a known master cylinder.
Figure 5B:
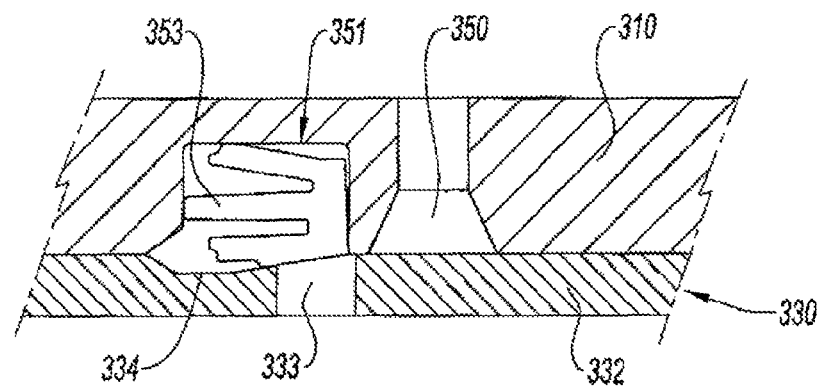
FIG. 5B is a schematic view illustrating the operation of the known primary piston when the brake circuit operates in ESP mode.
Figure 6:
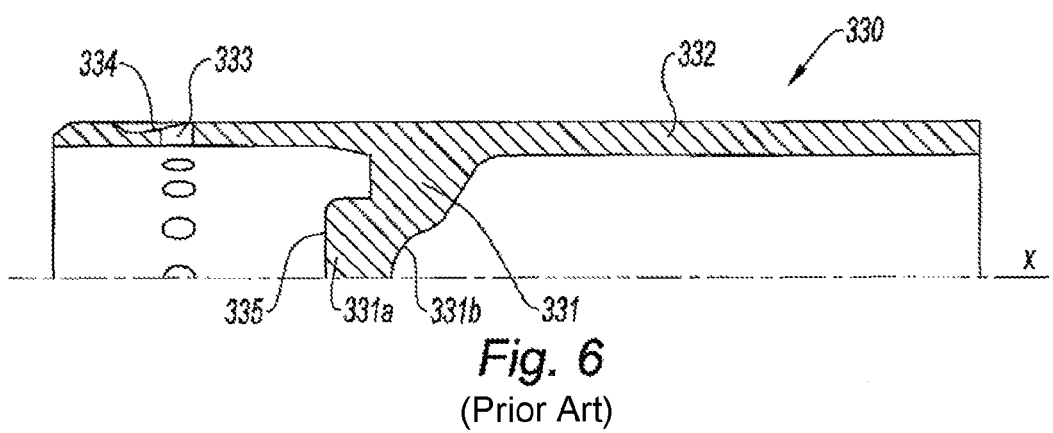
FIG. 6 is an axial cutaway of a known primary piston.
Figure 7A:
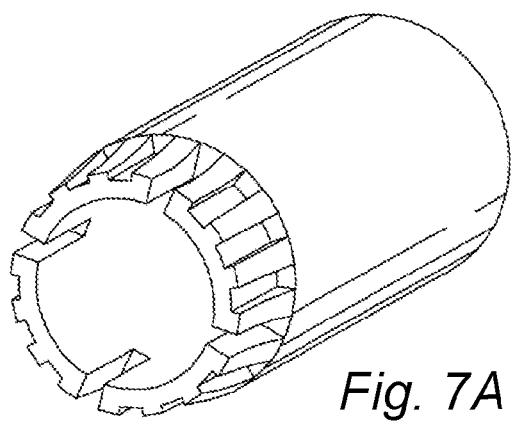
FIG. 7A is a first isometric view of an example of an embodiment of a piston according to the present invention.
Figure 7B:
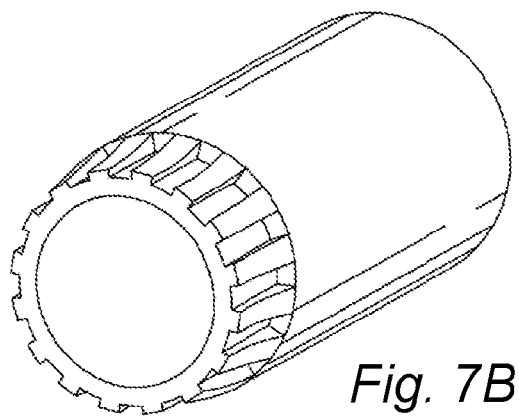
FIG. 7B is a second isometric view of an example of an embodiment of a piston according to the present invention.
Figure 7C:
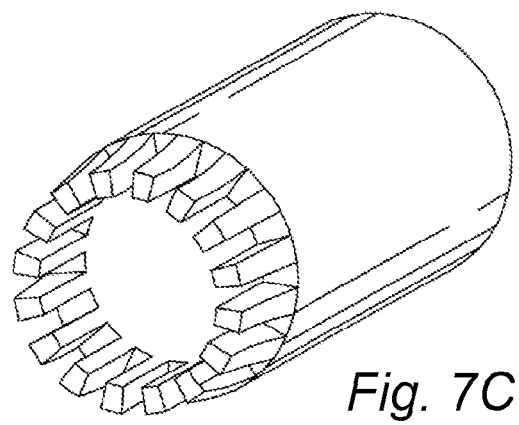
FIG. 7C is a third isometric view of an example of an embodiment of a piston according to the present invention.
Figure 7D:
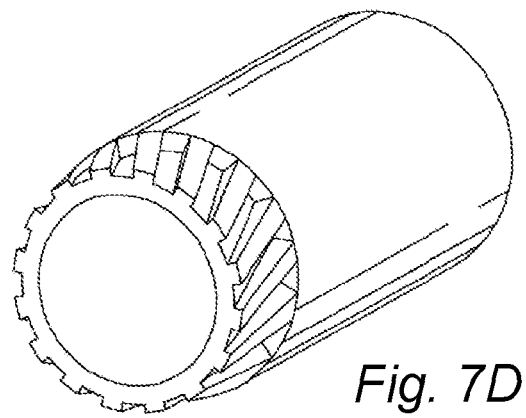
FIG. 7D is a fourth isometric view of an example of an embodiment of a piston according to the present invention.
Figure 7E:
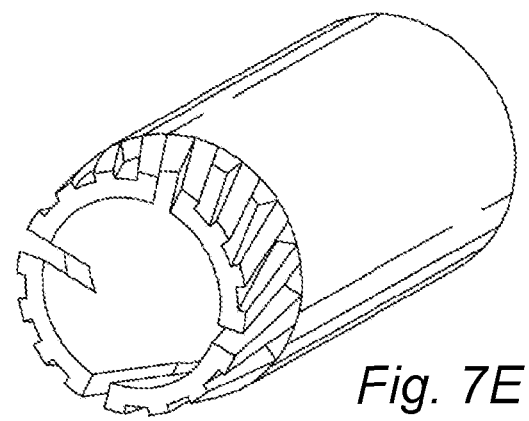
FIG. 7E is a fifth isometric view of an example of an embodiment of a piston according to the present invention.

The closed rear extremity 137b of grooves 137 is straight, transverse, that is, it includes a plane transverse surface, primarily perpendicular to the xx axis. Consequently, the frustoconical shape needed for the skirt of known primary piston 330 can be avoided in the vicinity of holes 333 (FIG. 5B).

FIG. 3 is an axial cutaway of a variant embodiment of piston 130A, wherein the front of skirt 132A has grooves 137A delimited between ribs 138A, having a forward extremity 138-1A inscribed in a cylinder and continuing rearward by a conical transition 138-2A to rejoin cylindrical portion 138-3A, that is, they are inscribed respectively in a frustoconical envelope and a cylindrical envelope.

FIG. 4 illustrates a partial cutaway of another variant 130B of the extremity of skirt 132B whose ribs 138B delimit grooves 137B, which are terminated by a conical front portion 138-1B. The other portions of grooves 137A, 137B are identical to those of groove 137.

Molding primary piston 130 of plastic material does not present any particular difficulties. The symmetrical rotating cylindrical shape means that piston 130 can be made in a simple mold without a moving part because the front cavity of the skirt delimiting the pressure chamber, the rear cavity of the skirt, on either side of back wall 131, as well as skirt 132 and grooves 137 of the skirt, have shapes that can be easily unmolded in the direction of the xx axis.

In the case of grooves 137 parallel to the xx axis, which have a helical shape, unmolding requires a rotational movement of the primary piston with respect to the injection mold or to a portion of it.

The primary piston is preferably made of a single piece of plastic material. Preferred examples of plastic materials for the manufacture of primary piston 330 are thermoset plastic materials.

The invention claimed is:

1. A tandem master-cylinder primary piston, comprising:
a skirt equipped with a wall in an intermediary position between extremities of the skirt, the wall including a rear face to support a servobrake thrust rod and a forward face to receive a telescoping rod and a compression spring acting on a secondary piston, wherein:
the skirt includes a forward extremity equipped with passages cooperating with a supply chamber to connect the supply chamber with a pressure chamber delimited in a body of a master cylinder by a forward part of the primary piston,
the passages cooperate with a resupply seal housed in a groove of the body of the master cylinder to allow passage of a hydraulic fluid in an ESP mode,
the wall includes a plastic material,
the forward extremity of the skirt includes a ribbed crown delimiting grooves closed in a rear and emerging toward a front to ensure passage between the supply chamber and the pressure chamber when the primary piston is in a supply position, and to enable passage of the hydraulic fluid beneath the resupply seal when the primary piston is in a rest position and a brake system is operating in the ESP mode, and
the skirt includes ribs delimiting the grooves, each rib including a first cylindrical portion extending from a front transverse face of the skirt, a conical portion connected to the first cylindrical portion, and a second cylindrical portion connected to the conical portion.

2. The tandem master-cylinder primary piston according to claim 1, wherein a rear, unopen extremity of the grooves is straight and transverse.

3. The tandem master-cylinder primary piston according to claim 2, wherein the rear extremity is planar.

4. The tandem master-cylinder primary piston according to claim 3, wherein the rear extremity is perpendicular to an axis of the primary piston.

5. The tandem master-cylinder primary piston according to claim 1, wherein the grooves have a helical shape.

6. The tandem master-cylinder primary piston according to claim 1, wherein at least one of the grooves is a slit.

7. The tandem master-cylinder primary piston according to claim 1, wherein the primary piston is realized as a single piece of plastic material.

8. The tandem master-cylinder primary piston according to claim 1, wherein the second cylindrical portion corresponds to a rear extremity of the grooves.

9. The tandem master-cylinder primary piston according to claim 1, wherein the rear face of the wall has a frusto-conical shape.

10. The tandem master-cylinder primary piston according to claim 1, wherein the forward face of the wall has a central boss for accommodating the telescoping rod.

11. A tandem master cylinder, comprising:
a primary piston of a plastic material and having a skirt including a forward extremity provided with longitudinal grooves open near a front, wherein:
the skirt is equipped with a wall in an intermediary position between extremities of the skirt, the wall including a rear face serving as a support for a servobrake thrust rod, and a forward face receiving a telescoping rod and a compression spring acting on a secondary piston,
the skirt includes a forward extremity equipped with passages cooperating with a supply chamber to connect the supply chamber with a pressure chamber delimited in a body of a master cylinder by a forward part of the primary piston,
the passages cooperate with a resupply seal housed in a groove of the body of the master cylinder to allow passage of a hydraulic fluid in an ESP mode,
the wall includes a plastic material,
the forward extremity of the skirt includes a ribbed crown delimiting grooves closed in a rear and emerging toward a front to ensure passage between the supply chamber and the pressure chamber when the primary piston is in a supply position, and to enable passage of the hydraulic fluid beneath the resupply seal when the primary piston is in a rest position and a brake system is operating in the ESP mode, and
the skirt includes ribs delimiting the grooves, each rib including a first cylindrical portion extending from a front transverse face of the skirt, a conical portion connected to the first cylindrical portion, and a second cylindrical portion connected to the conical portion.

12. The tandem master cylinder according to claim 11, wherein the primary piston is realized as a single piece of plastic material.

13. The tandem master-cylinder according to claim 11, wherein the second cylindrical portion corresponds to a rear extremity of the grooves.

14. A master-cylinder piston, comprising:
a skirt equipped with a wall in an intermediary position between extremities of the skirt, the forward extremity of the skirt including a ribbed crown having ribs delimiting grooves closed in a rear and emerging toward a front to enable passage of hydraulic fluid,
wherein the skirt and wall are realized as a single piece of plastic, and
each of the ribs delimiting the grooves includes a first cylindrical portion extending from a front transverse face of the skirt, a conical portion connected to the first cylindrical portion, and a second cylindrical portion connected to the conical portion.

* * * * *